(12) United States Patent
Shibusawa et al.

(10) Patent No.: US 11,953,046 B2
(45) Date of Patent: Apr. 9, 2024

(54) NUT

(71) Applicant: IWATA BOLT CO., LTD., Tokyo (JP)

(72) Inventors: Tetsuo Shibusawa, Tokyo (JP); Kenta Tasaka, Tokyo (JP)

(73) Assignee: IWATA BOLT CO., LTD., Tokyo (JP)

(*) Notice: Subject to any disclaimer, the term of this patent is extended or adjusted under 35 U.S.C. 154(b) by 337 days.

(21) Appl. No.: 17/432,760

(22) PCT Filed: Feb. 20, 2020

(86) PCT No.: PCT/JP2020/006881
§ 371 (c)(1),
(2) Date: Aug. 20, 2021

(87) PCT Pub. No.: WO2020/171181
PCT Pub. Date: Aug. 27, 2020

(65) Prior Publication Data
US 2022/0136552 A1  May 5, 2022

(30) Foreign Application Priority Data

Feb. 22, 2019  (JP) .................................. 2019-030448

(51) Int. Cl.
*F16B 33/02* (2006.01)
*F16B 37/00* (2006.01)
(52) U.S. Cl.
CPC ............. *F16B 33/02* (2013.01); *F16B 37/00* (2013.01)
(58) Field of Classification Search
CPC .......... F16B 33/02; F16B 37/00; F16B 37/02; F16B 37/04; F16B 39/14
(Continued)

(56) References Cited

U.S. PATENT DOCUMENTS 4,485,510 A * 12/1984 Hatter ................... F16B 31/021
470/9
4,790,703 A * 12/1988 Wing .................... F16B 39/284
411/416
(Continued)

FOREIGN PATENT DOCUMENTS

CN   109083911 A   12/2018
JP   S57-115419 U   7/1982
(Continued)

OTHER PUBLICATIONS

Jan. 5, 2023, Chinese Office Action issued for related CN Application No. 202080015737.4.

(Continued)

*Primary Examiner* — Roberta S Delisle

(74) *Attorney, Agent, or Firm* — Paratus Law Group, PLLC

(57) ABSTRACT

There is provided a nut in which occurrence of galling is prevented. The nut in which a depth t of a counterbore hole is set to be greater than $(D-d \times \cos \theta)/\tan \theta$, when a nominal diameter is D, an average value of a maximum outer diameter and a minimum outer diameter taking into account a tolerance of a bolt to be fitted is d [mm], an inner diameter of the counterbore hole provided on an insertion side of a screw hole is D+0.2 [mm], a pitch of a screw thread is P [mm], and $\theta$ satisfies $\theta = \arctan(P/d)$.

3 Claims, 5 Drawing Sheets

(58) Field of Classification Search
USPC .......................................... 411/427, 436, 437
See application file for complete search history.

(56) References Cited

U.S. PATENT DOCUMENTS

| | | | | |
|---|---|---|---|---|
| 4,850,771 | A * | 7/1989 | Hurd ....................... | F16B 29/00 |
| | | | | 29/523 |
| 4,957,401 | A * | 9/1990 | Hatter ................... | F16B 31/021 |
| | | | | 411/436 |
| 5,860,778 | A * | 1/1999 | Keener .................... | F16B 5/01 |
| | | | | 411/383 |
| 6,095,733 | A * | 8/2000 | Busby .................... | F16B 39/34 |
| | | | | 411/428 |
| 6,149,363 | A * | 11/2000 | March .................... | B21H 3/06 |
| | | | | 470/10 |
| 6,206,625 | B1 * | 3/2001 | Dessouroux ............ | F16B 39/04 |
| | | | | 411/211 |
| 2001/0026746 | A1 * | 10/2001 | Calandra, Jr. ....... | E21D 21/0086 |
| | | | | 411/436 |
| 2008/0193254 | A1 * | 8/2008 | Selle ..................... | F16B 37/062 |
| | | | | 411/188 |
| 2011/0311334 | A1 * | 12/2011 | Makino ................. | F16B 37/067 |
| | | | | 148/225 |
| 2018/0355904 | A1 | 12/2018 | Kageyama | |

FOREIGN PATENT DOCUMENTS

| | | |
|---|---|---|
| JP | S60-188217 U | 12/1985 |
| JP | H07-238914 A | 9/1995 |
| JP | 2000-291620 A | 10/2000 |
| WO | WO 2010/086962 A1 | 8/2010 |

OTHER PUBLICATIONS

Apr. 21, 2020, International Search Report issued for related PCT Application No. PCT/JP2020/006881.

Apr. 21, 2020, International Search Opinion issued for related PCT Application No. PCT/JP2020/006881.

* cited by examiner

NUT

CROSS REFERENCE TO PRIOR APPLICATION

This application is a National Stage Patent Application of PCT International Patent Application No. PCT/JP2020/006881 (filed on Feb. 20, 2020) under 35 U.S.C. § 371, which claims priority to Japanese Patent Application No. 2019-030448 (filed on Feb. 22, 2019), which are all hereby incorporated by reference in their entirety.

TECHNICAL FIELD

The present invention relates to a nut.

BACKGROUND ART

A nut is known as described in Patent Literature 1.

CITATION LIST

Patent Literature

Patent Literature 1: JP-A-1995-238914

SUMMARY OF INVENTION

Technical Problem

Patent Literature 1 suggests a nut provided with a screw-in introduction unit without a screw thread in a screw hole. By providing the nut, Patent Literature 1 can improve the bite of a bolt and a nut, or hold the bolt and the nut at a right angle to prevent diagonal biting of the bolt and the nut.

An object of the present invention is to provide a nut in which galling during fastening is prevented.

Solution to Problem

In order to achieve the above-described object, according to an aspect of the present invention, there is provided a nut in which a depth t of a counterbore hole is set to be greater than a value calculated by Equation (1), when a nominal diameter is M, an average value of a maximum outer diameter and a minimum outer diameter taking a tolerance of a bolt to be fined into account is d [mm], an inner diameter D of the counterbore hole provided on an insertion side of a screw hole is M+0.2 [mm], a pitch of a screw thread is P [mm], and θ satisfies θ=arc tan(P/d).

$$t = (D - d \times \cos\theta)/\tan\theta \quad \text{Equation (1)}$$

Advantageous Effects of Invention

In the nut according to the present invention, galling due to a bolt during fastening is prevented.

DESCRIPTION OF EMBODIMENTS

Figure 1:
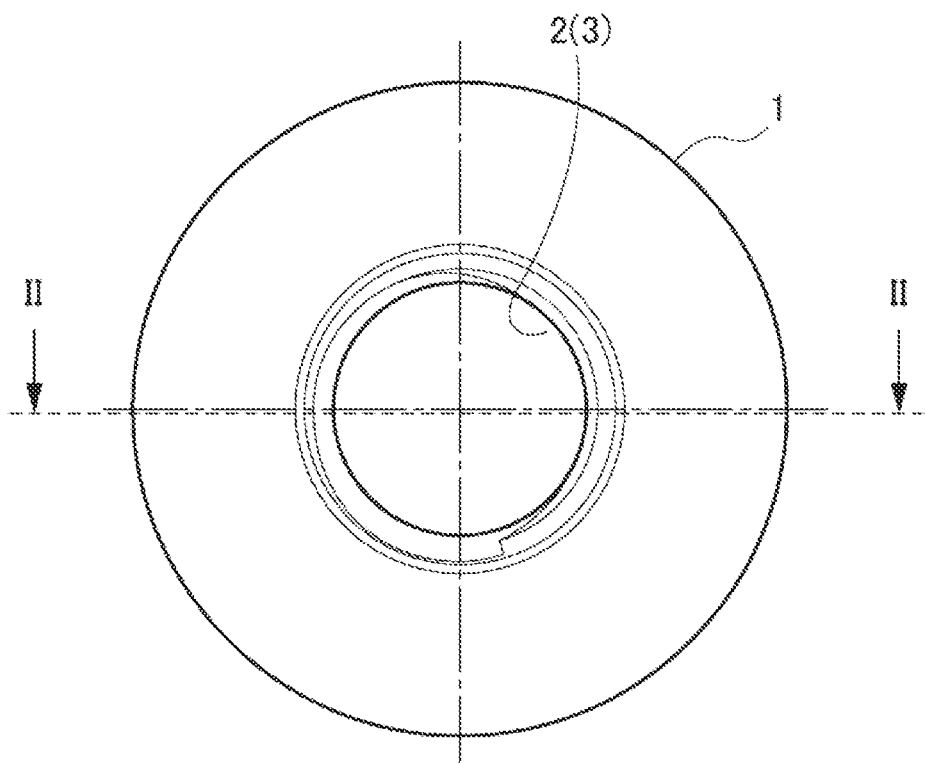
FIG. 1 is a top view of a nut according to an embodiment of the present invention.
Figure 2:
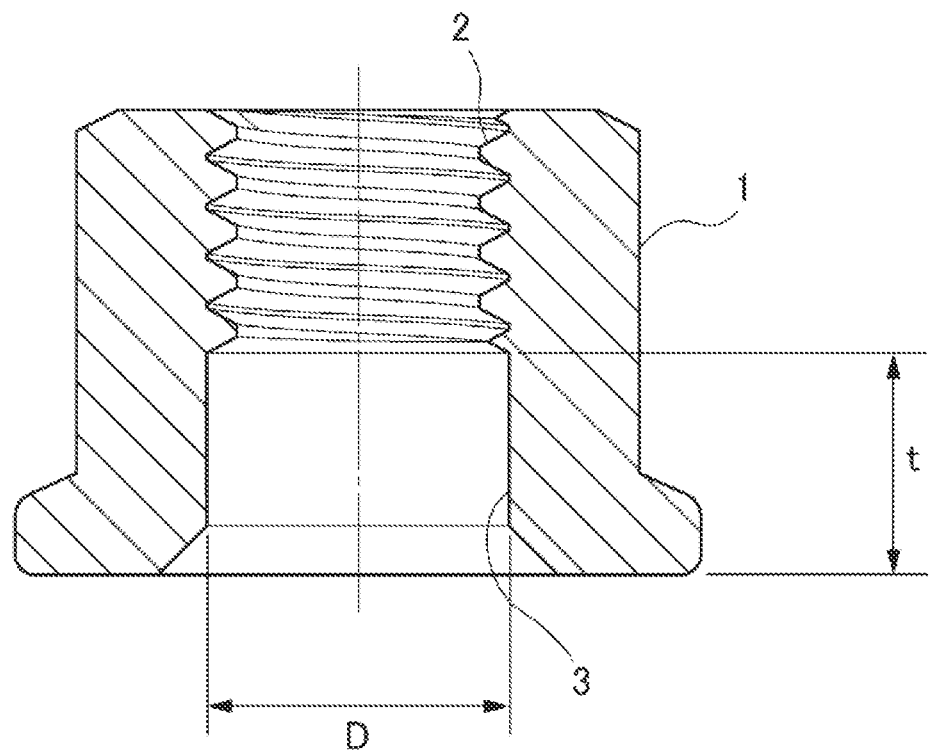
FIG. 2 is a sectional view taken along line II-II of the nut shown in FIG. 1.

FIGS. 1 and 2 describe a nut 1 according to an embodiment of the present invention. FIG. 1 is a top view of the nut 1, and FIG. 2 is a sectional view taken along line II-II of FIG. 1.

As shown in FIGS. 1 and 2, the nut 1 is provided with a screw hole 2. A counterbore hole 3 is provided on the insertion side of the screw hole 2. The counterbore hole 3 is a hole with no screw thread on the inner circumferential surface. The counterbore hole 3 has a smooth inner circumferential surface. The nut 1 of the present embodiment prevents the screw thread of a bolt 10 inserted while being inclined to the screw hole 2 of the nut 1 from coming into contact with the smooth inner circumferential surface of the counterbore hole 3, and prevents the bolt 10 from being screwed into the nut 1 while being inclined.

Incidentally, the inventor keenly studied under which condition a phenomenon (hereinafter, referred to as galling) occurs in which the bolt 10 is inserted into the nut 1 while being inclined and the screw thread of the bolt 10 gnaws the screw thread of the nut 1. The inventor thought that the inclination angle (hereinafter, simply referred to as inclination angle) of the bolt 10 to the screw hole 2 of the nut 1 was one of the reasons of the occurrence of galling, and conducted experiments using an experiment device shown in FIG. 3.

Figure 3:
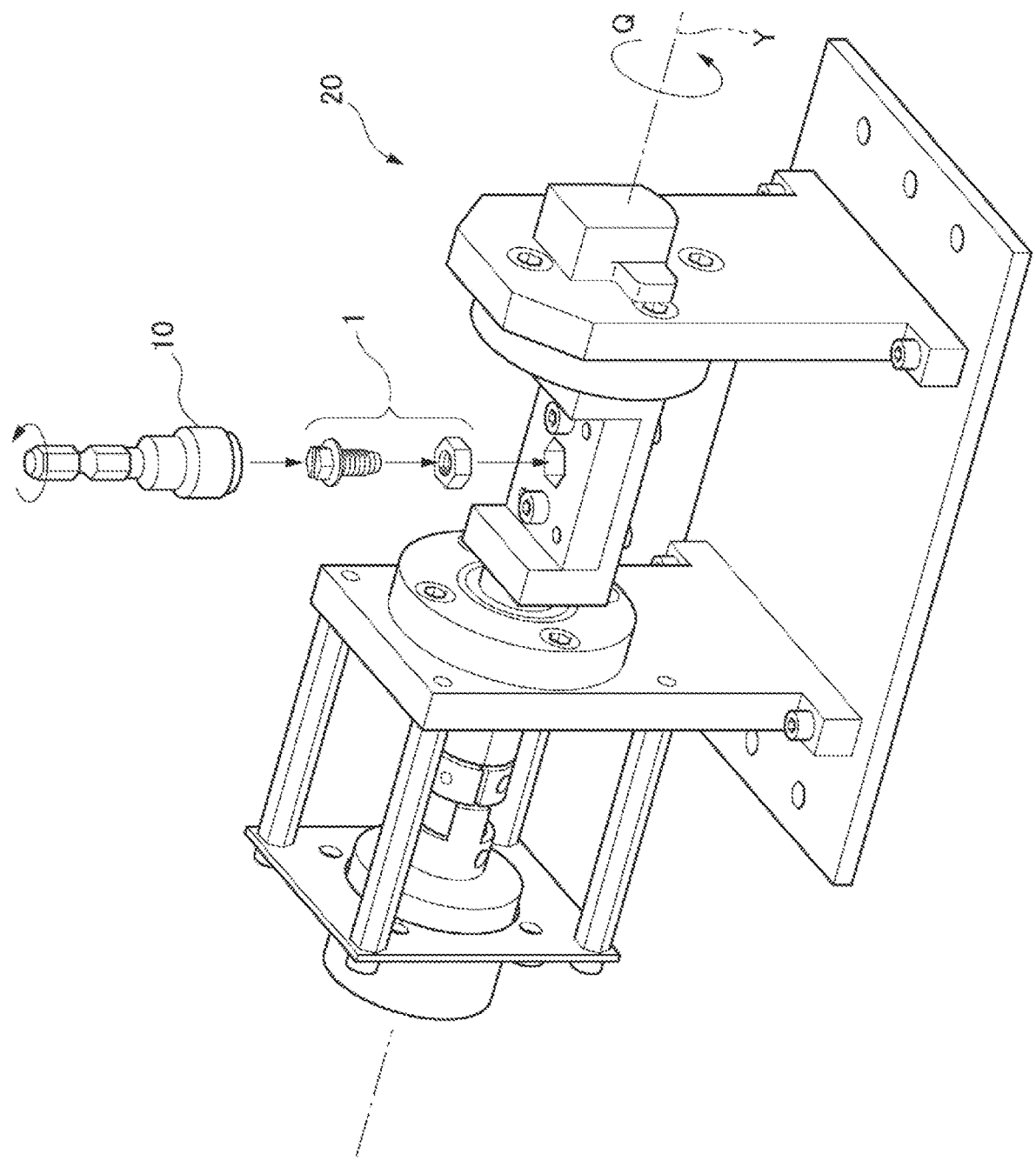
FIG. 3 is a view showing an aspect of a galling angle measurement test equipment.

FIG. 3 is a view showing an aspect of galling angle measurement test equipment 20. As shown in FIG. 3, the nut 1 is fixed to a stage that can rotate around a rotation axial line Y that extends in the horizontal direction. The nut 1 is fixed to a stage in a posture where the screw hole 2 extends in the vertical direction. The galling angle measurement test equipment 20 is configured to be capable of detecting the rotation angle around the rotation axial line Y as the inclination angle.

The bolt 10 is screwed into the nut 1 from above in the vertical direction. The bolt 10 is rotated around the rotation axial line that extends in the vertical direction at a constant rotation speed by a motor (not shown). Even when rotating the bolt 10, the posture of the bolt 10 does not change. In other words, even when rotating the bolt 10, the axial line of the bolt 10 remains in the vertical direction.

In the present embodiment, an initial state where the upper surface of the stage makes an angle to the horizontal direction can be set before the start of the test. By setting the nut 1 on the upper surface of the stage in the initial state, the bolt 10 can be screwed into the nut 1 in a state where the bolt 10 and the nut 1 make an inclination angle.

When moving the viewpoint around the axial line of the nut 1, the angle between an axial line g of the bolt 10 and an axial line G of the nut 1 changes. The inclination angle here is an angle made by the axial line g of the bolt 10 and the axial line G of the nut 1, when viewed from the viewpoint where the angle made by the axial line g of the bolt 10 and the axial line G of the nut 1 is the greatest.

In the test, the inclination angle change over time was recorded when the M6 bolt 10 was screwed into the M6 nut 1 in a state where the initial inclination angle is set to 12°. The measurement result is shown in FIG. 4.

Figure 4:
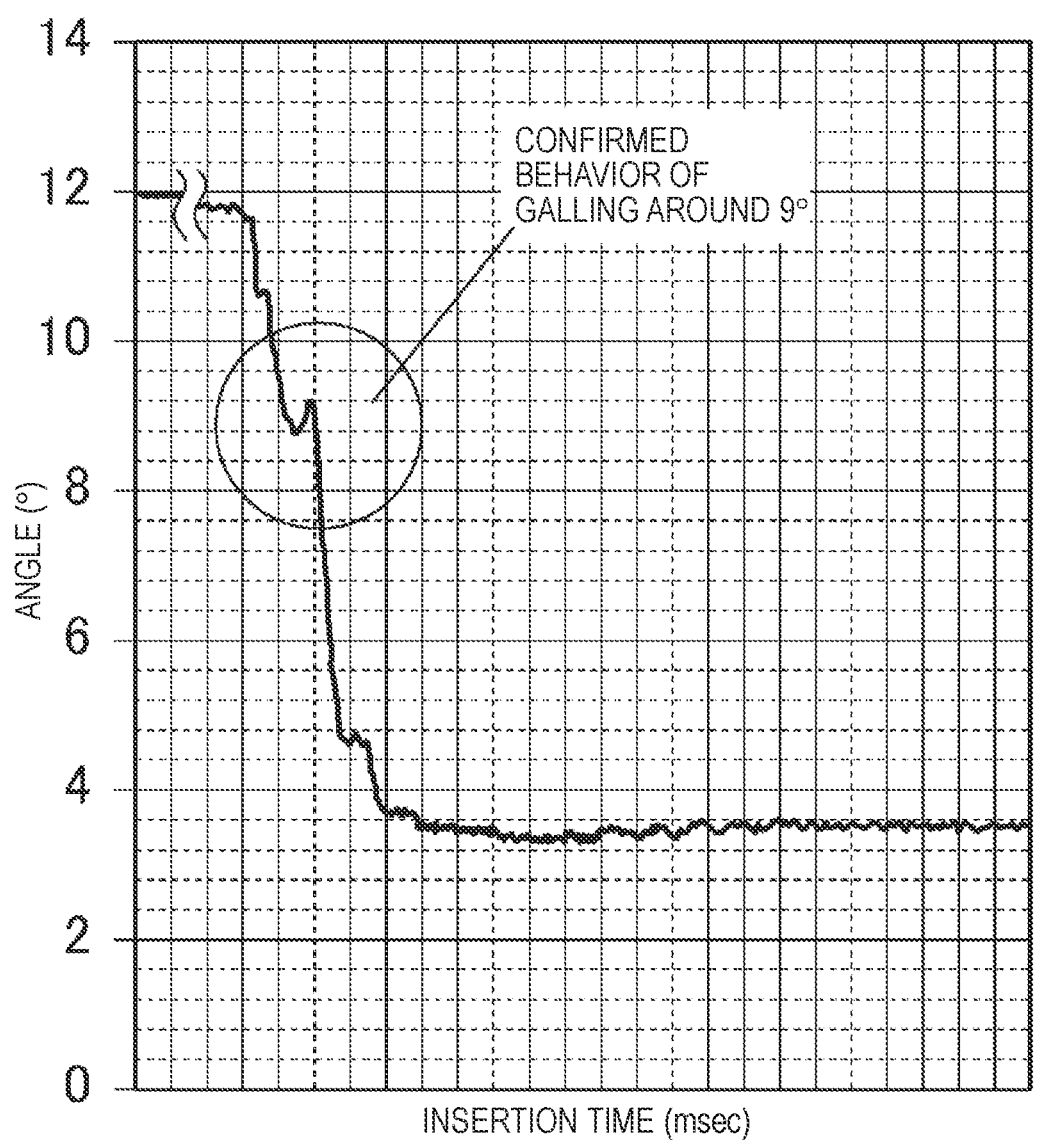
FIG. 4 is a view showing a measurement result of an inclination angle.

FIG. 4 is a view showing the measurement result of the inclination angle. As shown in FIG. 4, it was confirmed that the inclination angle fluctuated greatly when the inclination angle was between 8.8° and 9.2°, and galling occurred. In the example shown in FIG. 4, when the bolt 10 is continued to be rotated after galling occurs, the inclination angle fluctuation stabilizes after the inclination angle suddenly becomes small, and the bolt 10 and the nut 1 are fastened at an inclination angle of approximately 3.6°.

When the same test as above was repeatedly conducted using the test equipment 20 in FIG. 3, the occurrence of galling was frequently observed at an inclination angle of around 9°. When the inclination angle was set to be less than 9° in the initial state, galling was extremely unlikely to occur. Based on the experiment result, the inventor thought that the occurrence of galling could be prevented by setting the initial inclination angle when screwing the bolt 10 into the nut 1 to be less than a predetermined value. Specifically, the inventor thought that the initial inclination angle when the bolt 10 is screwed into the nut 1 was set to be less than a predetermined value by providing a counterbore hole 3 in the nut 1.

Figure 5:
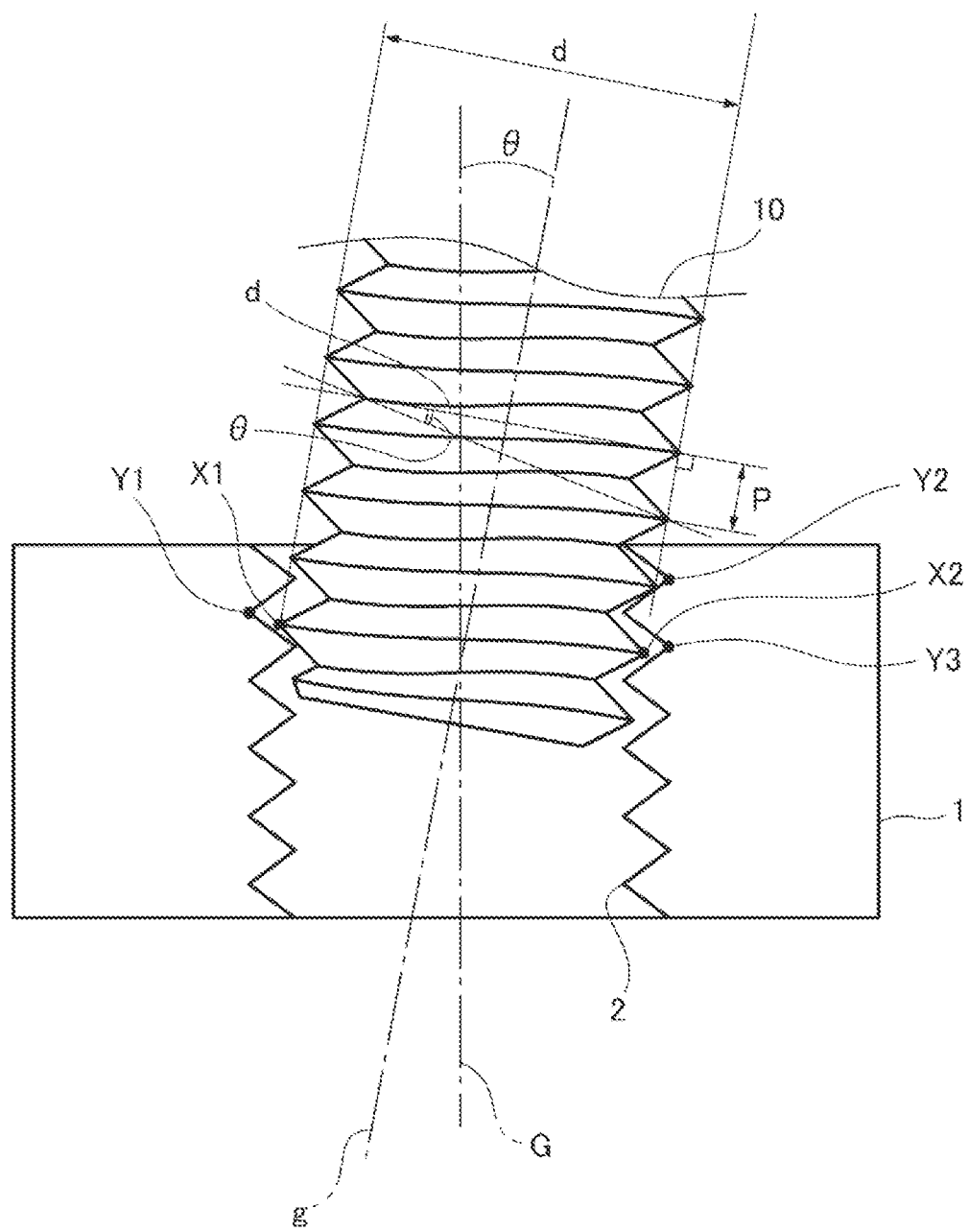
FIG. 5 is a view for describing the inclination angle.

FIG. 5 is a sectional view showing an aspect where the bolt 10 is screwed into the nut 1 at the inclination angle. FIG. 5 is a view of the cross section of the nut 1 and the bolt 10 when the inclination angle is maximum. As shown in FIG. 5, the angle between the nut axial line G (the center line of the screw hole 2) and the bolt axial line g (the center line of the bolt 10) is defined as an inclination angle $\theta$. The root diameter of the screw hole 2 of the nut 1 is D (nominal diameter D), and the outer diameter of the bolt 10 that fits into the nut 1 having the nominal diameter D is d.

As shown in FIG. 5, when the cross section of the nut 1 is viewed, the screw threads positioned on the left side of the bolt 10 are engaged with the screw threads positioned on the left side of the nut 1, and the screw threads positioned on the right side of the bolt 10 are engaged with the screw threads positioned on the right side of the nut 1.

When galling occurs, as shown in FIG. 5, when the k-th (k is any natural number) screw thread positioned on the left side of the bolt 10 is engaged with the n-th (n is any natural number) screw thread positioned on the left side of the nut 1, the k-th screw thread positioned on the right side of the bolt 10 is engaged with the (n+1)th screw thread positioned on the right side of the nut 1.

In FIG. 5, a first (k=1) screw thread X1 positioned on the left side of the bolt 10 is engaged with a first (n=1) screw thread positioned on the left side of the nut 1. However, a first thread X2 positioned on the right side of the bolt 10 is engaged with a screw thread Y3 instead of a first screw thread Y2 positioned on the right side of the nut 1.

In FIG. 5, one pitch of a tip of the bolt 10 is an incomplete screw thread.

A case where the bolt 10 having the outer diameter d is inserted into the nut 1 at the inclination angle $\theta$ in this manner and the screw threads are shifted by one pitch here, can be expressed as tan $\theta$=P/d, and thus, the following Equation (1) can be expressed.

$$\theta = \arctan(P/d) \quad \text{Equation (1)}$$

Figure 6:
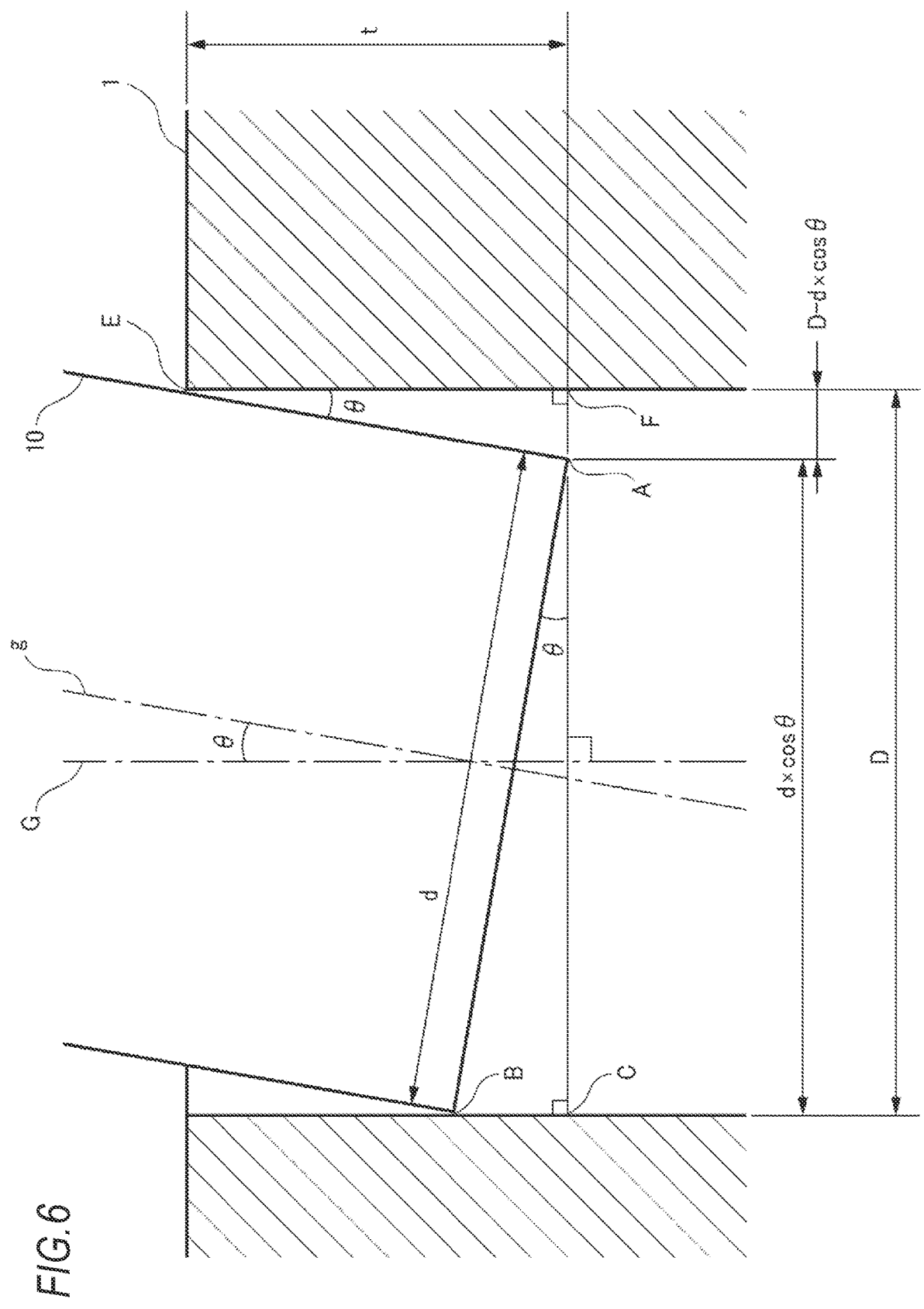
FIG. 6 is a view for describing a depth of a counterbore hole.

In order to prevent the bolt 10 inserted into the nut 1 at the inclination angle $\theta$ from coming into contact with the screw hole 2 of the nut 1 at the lowest point thereof, the inventor devised to provide the counterbore hole 3 in the nut 1. As shown in FIG. 6, a depth t of the counterbore hole 3 to be provided for such purpose can be obtained as follows in relation to the nut 1 having the nominal diameter D.

First, points A to C, F, and E and the length t are defined as follows.

Point A: Of the two vertices of the lower edge of the bolt 10, a point (the lowest point of the bolt 10) which is inserted deeply into the nut 1

Point B: Of the two vertices of the lower edge of the bolt 10, a point which is inserted shallowly into the nut 1

Point C: A point where the line segment orthogonal to the nut axial line G through the point A intersects the inner circumferential surface of the nut 1 at the point B side Point F: A point where the line segment orthogonal to the nut axial line G through the point A intersects the inner circumferential surface of the nut 1 on the opposite side of the point B Point E: A point where the line segment parallel to the nut axial line through the point F intersects the upper surface of the nut 1

Length t: Length (distance between the lowest point of the bolt 10 and the upper surface of the nut 1, parallel to the nut axial line G) of a line segment FE The length of a line segment CF is equal to the root diameter (nominal diameter D) of the screw hole 2 of the nut 1.

The length of a side AC of a right triangle ABC is a cosine component of a side AB, which is the outer diameter d of the bolt 10. In other words, AC=d×cos $\theta$.

The length of a line segment AF is a length obtained by subtracting the line segment AC from the root diameter (nominal diameter D) of the screw hole 2 of the nut 1. In other words, AF=D−d×cos $\theta$.

For a triangle AFE, tan $\theta$=(D−d×cos $\theta$)/t is established.

In other words, the depth t can be expressed by the following Equation (2).

$$t=(D-d\times\cos\theta)/\tan\theta \quad \text{Equation (2)}$$

To summarize, by forming the counterbore hole 3 with $\theta$ and t that satisfy the following Equation (1) and Equation (2), the inclination angle between the bolt 10 and the nut 1 that is formed when the screw threads of the bolt 10 begin to be engaged with the screw threads of the nut 1 can be set to be less than the angle at which galling is likely to occur.

Even when the existing bolt 10 is screwed into the nut 1 according to the embodiment, galling is unlikely to occur. Accordingly, the nut 1 in which galling is unlikely occur is provided.

$$\theta = \arctan(P/d) \quad \text{Equation (1)}$$

$$t=(D-d\times\cos\theta)/\tan\theta \quad \text{Equation (2)}$$

There is a case where an incomplete screw thread is formed for approximately two pitches at the tip of the bolt 10. In other words, when an incomplete screw thread is formed, even at the same inclination angle, the bolt 10 will be inserted deeply into the nut 1 by this amount (2P/cos $\theta$). Here, it is preferable that the depth t of the counterbore hole 3 is deepened by this amount (2P/cos $\theta$). In other words, it is preferable that the depth of the counterbore hole 3 is greater than t1 in the following Equation (3).

$$t1=(D-d\times\cos\theta)/\tan\theta+2P/\cos\theta \quad \text{Equation (3)}$$

As shown in FIG. 1, there is a case where the inlet of the nut 1 has a chamfer portion for 1.25×pitch. In other words, when the chamfer portion is formed, even at the same inclination angle, the bolt 10 will be inserted shallowly into the nut 1 by this amount (1.25×P/√2). Here, it is preferable that the depth t of the counterbore hole 3 is deepened by this amount (1.25×P/√2). In other words, it is preferable that the depth of the counterbore hole 3 is greater than t2 in the following Equation (4).

$$t2=(D-d\times\cos\theta)/\tan\theta+2P/\cos\theta+1.25\times P/\sqrt{2} \qquad \text{Equation (4)}$$

In the description above, the inner diameter D of the counterbore, hole 3 was set to the nominal diameter of the nut 1, but it is preferable to set D to the nominal diameter of the nut 1+0.2 [mm] to ensure that the screw threads of the nut 1 do not come into contact with the screw threads of the bolt 10.

In the description above, d is simply described as the outer diameter of the bolt 10, but the outer diameter of the bolt 10 varies depending on the tolerance even for the bolt 10 having the same nominal diameter. Therefore, the average value of the maximum outer diameter and the minimum outer diameter of the bolt 10 corresponding to the nominal diameter D is used as the outer diameter d of the bolt 10.

In the description above, an example in which the normal bolt 10 is screwed into the nut 1 was described, but a pilot bolt may also be screwed into the nut 1. Since the pilot bolt has a guide portion without screw threads at the tip, even when the pilot bolt is diagonally inserted into the nut 1, the screw threads of the pilot bolt are unlikely to interfere with the screw threads of the nut 1 and galling is unlikely to occur.

INDUSTRIAL APPLICABILITY

According to the present invention, there is provided a nut in which galling due to a bolt during fastening is prevented.

REFERENCE SIGNS LIST

1: nut
2: hole
3: counterbore hole
10: bolt
20: galling angle measurement test equipment
g: bolt axial line
G: nut axial line
P: pitch
θ: inclination angle

What is claimed is:

1. A nut comprising:
a counterbore hole; and
a screw hole having a screw thread,
wherein a depth t of the counterbore hole is set to be greater than a value calculated by Equation (1),
wherein a nominal diameter of the screw hole is D,
wherein an average value of a maximum outer diameter of a bolt configured to be fitted into the nut and a minimum outer diameter of the bolt, determined according to a tolerance of the bolt, is d [mm],
wherein an inner diameter of the counterbore hole provided on an insertion side of the screw hole is D+0.2 [mm],
wherein a pitch of the screw thread is P [mm],
wherein θ satisfies θ=arctan(P/d), and
wherein Equation 1=(D−d×cos θ)/tan θ.

2. The nut according to claim 1,
wherein when the pitch of the screw thread is P [mm], the depth t of the counterbore hole is set to be greater than a value calculated by Equation (2), and
wherein Equation 2=(D−d×cos θ)/tan θ+2×P/cos θ.

3. The nut according to claim 2,
wherein a chamfer portion is provided on the insertion side of the counterbore hole,
wherein the depth t of the counterbore hole is set to be greater than a value calculated by Equation (3), and
wherein Equation 3=(D−d×cos θ)/tan θ+2×P/cos θ+1.25× P/√2.

* * * * *